(12) United States Patent
El Idrissi et al.

(10) Patent No.: US 10,218,499 B1
(45) Date of Patent: Feb. 26, 2019

(54) SYSTEM AND METHOD FOR SECURE COMMUNICATIONS BETWEEN CONTROLLERS IN A VEHICLE NETWORK

(71) Applicant: Lear Corporation, Southfield, MI (US)

(72) Inventors: Younes El Hajjaji El Idrissi, Rocade Rabat (MA); Andre Weimerskirch, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/723,273

(22) Filed: Oct. 3, 2017

(51) Int. Cl.
G06F 21/00 (2013.01)
H04L 9/08 (2006.01)
H04L 29/06 (2006.01)
H04L 9/32 (2006.01)
G06F 21/73 (2013.01)
H04L 12/40 (2006.01)

(52) U.S. Cl.
CPC .......... H04L 9/0819 (2013.01); G06F 21/73 (2013.01); H04L 9/3242 (2013.01); H04L 63/065 (2013.01); H04L 63/0876 (2013.01); H04L 2012/40215 (2013.01); H04L 2012/40273 (2013.01); H04L 2209/84 (2013.01)

(58) Field of Classification Search
CPC ........ G06F 21/45; G06F 21/44; G06F 21/445; G06F 21/70; G06F 21/71; G06F 21/73; H04L 63/06; H04L 63/065; H04L 63/08; H04L 63/0876
See application file for complete search history.

(56) References Cited

U.S. PATENT DOCUMENTS

| 9,413,732 | B2 | 8/2016 | Koide | |
|---|---|---|---|---|
| 2007/0118752 | A1 | 5/2007 | Kiessling et al. | |
| 2014/0040992 | A1* | 2/2014 | Koide | H04L 9/3242 726/4 |
| 2015/0089236 | A1* | 3/2015 | Han | H04L 9/3242 713/181 |
| 2015/0373158 | A1 | 12/2015 | Kim | |

OTHER PUBLICATIONS

Kyusuk Han et al., A Practical Solution to Achieve Real-Time Performance in the Automotive Network by Randomizing Frame Identifier, University of Michigan Transportation Research Institute, Oct. 26, 2015, Ann Arbor, Michigan, USA.

* cited by examiner

Primary Examiner — Edward Zee
(74) Attorney, Agent, or Firm — Brooks Kushman P.C.

(57) ABSTRACT

A system and method are described for secure communications between controllers in a vehicle network. The system includes multiple controllers associated in a group and configured to communicate with each other, each having an initial controller identification (ID) number and configured to communicate with a gateway controller. Each controller in the group is configured to calculate an updated controller ID number and transmit the updated controller ID to the gateway controller in a secure fashion, and the gateway controller is configured to authenticate and transmit the updated controller ID of each controller in the group to all the controllers in the group in a secure fashion. Each controller in the group is further configured to include its updated controller ID in network messages transmitted to other controllers in the group, and to authenticate other controllers in the group based on the updated controller IDs in network messages from other controllers.

19 Claims, 5 Drawing Sheets

SYSTEM AND METHOD FOR SECURE COMMUNICATIONS BETWEEN CONTROLLERS IN A VEHICLE NETWORK

TECHNICAL FIELD

The following relates to a system and method for secure communications between controllers in a vehicle network.

BACKGROUND

Modern vehicles include distributed embedded Electronic Control Units (ECUs) and software-based components which are carefully tested for proper functional behavior. New vehicles may be equipped with more than 70 ECUs that may be controlled via a Controller Area Network (CAN), Local Interconnect Network (LIN), FlexRay, WLAN or other suitable network. CAN is the most extensively embedded network protocol in vehicles.

Attacks on vehicle networks can be mounted via unauthorized control messages injected into such networks. In that regard, security vulnerabilities in current automotive networks have been verified by executing various attack scenarios. These scenarios can be classified into four categories: injection, interception, modification and interruption. To prevent injection and replay attacks, CAN networks need to support frame authentication. However, the maximum data transfer rate of CAN is 1 Mbps and the maximum payload of a message is 8 bytes, which make authentication over CAN difficult.

To overcome these kinds of vehicle network attacks, a message authentication technique is needed to achieve secure vehicle network communication. The applicants have recognized that such a technique would include a centralized authentication system for a vehicle network, such as a CAN network, with authentication key establishment between connected ECUs.

In a CAN network, the applicants have recognized that such a technique would present a new symmetric key framework to secure communication inside a defined virtual CAN group. Using the cryptosystem of such a technique, each ECU in the virtual group would generate a periodic authentication key associated with a new randomized ID. Such a technique would thereby provide an anti-spoofing mechanism based on hiding an original CAN ID by periodically generating a random ID and appending a message authentication tag to each payload CAN message.

The applicants have recognized that with such a technique, only those ECUs belonging to a virtual group could interpret and exploit a received message. An attacker would not be able to link the new CAN IDs to the original IDs, and therefore would not be able to mount an attack or inject, intercept or modify any CAN message. The key framework of such a technique would also allow vehicle manufacturers to encrypt data communication between two ECUs or between a cloud and an ECU.

SUMMARY

According to one non-limiting exemplary embodiment described herein, a system is provided for secure communications between controllers in a vehicle network. The system comprises a plurality of controllers associated in a group and configured to communicate with each other, each controller in the group having an initial controller identification (ID) number and configured to communicate with a gateway controller. Each controller in the group is configured to calculate an updated controller ID number and to transmit in a secure fashion the updated controller ID number to the gateway controller, and the gateway controller is configured to authenticate the updated controller ID number of each controller in the group and to transmit in a secure fashion the updated controller ID number of each controller in the group to all of the controllers in the group. Each controller in the group is further configured to include its updated controller ID number in network messages transmitted to other controllers in the group, and to authenticate other controllers in the group based on the updated controller ID numbers in network messages received from the other controllers.

According to another non-limiting exemplary embodiment described herein, a method is provided for secure communications in a vehicle network comprising a plurality of controllers associated in a group and configured to communicate with each other, each of the controllers in the group having an initial controller identification (ID) number, and a gateway controller configured to communicate with each controller in the group. The method comprises each controller in the group calculating an updated controller ID number and transmitting in a secure fashion the updated controller ID number to the gateway controller, and the gateway controller authenticating the updated controller ID number of each controller in the group and transmitting in a secure fashion the updated controller ID number of each controller in the group to all of the controllers in the group. The method further comprises each controller in the group including its updated controller ID number in network messages transmitted to other controllers in the group, and authenticating other controllers in the group based on the updated controller ID numbers in network messages received from the other controllers.

According to yet another non-limiting exemplary embodiment described herein, a non-transitory storage medium is provided having stored computer executable instructions for providing secure communications in a vehicle network including a plurality of controllers associated in a group and configured to communicate with each other, each of the controllers in the group having an initial controller identification (ID) number, and a gateway controller configured to communicate with each controller in the group. The instructions when executed cause each controller in the group to calculate an updated controller ID number and to transmit in a secure fashion the updated controller ID number to the gateway controller, and each controller in the group to include its updated controller ID number in network messages transmitted to other controllers in the group, and to authenticate other controllers in the group based on the updated controller ID numbers in network messages received from the other controllers, and the gateway controller to authenticate the upload controller ID number of each controller in the group and to transmit in a secure fashion the updated controller ID number of each controller in the group to all of the controllers in the group.

A detailed description of these and other non-limiting exemplary embodiments of a system and method for secure communications between controllers in a vehicle network is set forth below together with the accompanying drawings.

DETAILED DESCRIPTION

Figure 1:
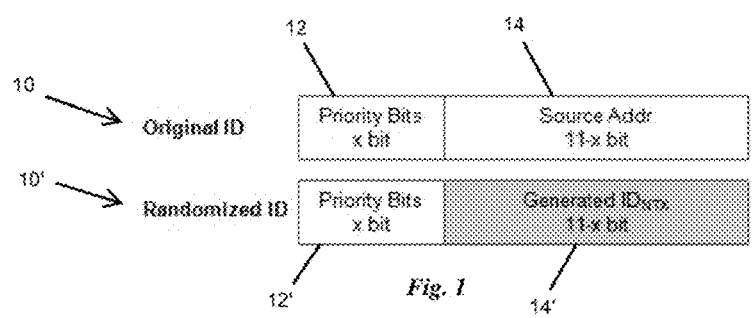
FIG. 1 is an illustration of controller area network (CAN) formatted frames according to one non-limiting exemplary embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to FIGS. 1-7, a more detailed description of non-limiting exemplary embodiments of a system and method for secure communications between controllers in a vehicle network will be provided. For ease of illustration and to facilitate understanding, like reference numerals have been used herein for like components and features throughout the drawings.

The present disclosure is directed to a message authentication technique to overcome various kinds of vehicle network attacks and achieve secure vehicle network communication. Such a technique includes a centralized authentication system for a vehicle network, such as a CAN network, with authentication key establishment between connected ECUs.

Using a CAN network as an example, the present disclosure provides an anti-spoofing mechanism based on hiding an original CAN ID of an ECU by periodically generating a random ID for that ECU and appending a message authentication tag to each payload CAN message. The present disclosure further presents a new symmetric key framework to secure communication inside a defined virtual CAN group. Using the cryptosystem of the present disclosure, each ECU in the virtual group generates a periodic authentication key associated with a new randomized ID.

According to the present disclosure, only those ECUs belonging to a virtual group can interpret and exploit a received message. An attacker cannot link the new CAN IDs to the original IDs and therefore cannot mount an attack or inject, intercept or modify any CAN message. The key framework of the present disclosure also allows vehicle manufacturers to encrypt data communication between two ECUs or between a cloud and an ECU.

More particularly, a vehicle manufacturer or other entity defines a virtual group of specific ECUs controlled by gateway GECU. All ECUs forming a virtual group share a symmetric key K_s which is randomly generated at an assembly line. At the assembly line, each ECU_i creates a symmetric key K_i which will be shared with gateway GECU. Each ECU has a secure ID_key table which contains the ID of all frames in the network and their shared authentication key. CAN frames are identified by the defined CAN-ID and their order in ID_key table. For example, CAN speed frame will have always index 2 in ID_key table.

A key framework includes generating, for each ECU, static and dynamic authentication keys from K_s and each authentication key correspond to a generated random ID. The ECU's static authentication key is shared only with gateway, while the dynamic authentication key and IDs are shared with all ECUs in the virtual group through the gateway. The generated authentication keys are used to hide the ECU's identities, to authenticate ECUs, and also can be used by ECUs when they need to establish a secure communication with other ECUs. For this, each ECU has a secure ID_key table which contains the ID of all ECUs in the network and their shared authentication key. A list of symbols used in describing the protocol with notation definitions is shown in Table 1.

TABLE 1

| Notation | Definition |
| --- | --- |
| X∥Y | Concatenation of X and Y. |
| $K_{-Ai}$ | Temporary Authentication key of ECUi. |
| KDF | Cryptographic one-way key derivation function |
| Hash | Public cryptographic one-way secured hash function. |
| E (K, X) | Encrypt X using key K. |
| $MAC_X$ | Message integrity check generated by X. |
| $ID_X$ | Identifier of $ECU_x$. |
| $ID_{NTX}$ | Next Identifier of $ECU_x$. |

ID Randomization

Authentication methods for CAN networks have been proposed that focus on adding a message authentication code (MAC) in the data field or encrypting sent data. In such methods, the receivers must perform cryptographic computations to verify the validity of all frames even if these frames have been sent by a compromised ECU. This implies additional computation by ECUs and increases the risk of denial-of-service (DoS) attacks.

Another authentication technique has been proposed based on ID anonymization for each CAN frame. In this technique, each ECU applies a filter ID that only allows CAN frames that have one of the selected CAN IDs to pass for further processing. However, this technique requires time synchronization between sender and receiver, generates a new ID for each CAN message, and requires each new ID to synchronize and share a nonce between sender and receivers.

To overcome these limitations and to protect CAN data, the present disclosure includes an ID randomization process in which each ECU generates periodically a new identity $ID_{NX}$. The generated $ID_{NX}$ is first validated by the gateway ECU then securely shared with others ECUs in the network via the gateway. The temporary generated $ID_{NX}$ will be identified only by the authorized ECUs and will appear anonymous to unauthorized ECUs. The random ID is secured with the dynamic authentication key. Each ECU has a filter ID table which contains the temporary $ID_{NX}$ and the authentication keys of all ECUs in the network. The filter is updated when the ECU receives and accepts an update frame from the gateway. The link between the original IDs (defined by the original equipment manufacturer (OEM)) and the new randomized ID is assured by using table order.

To preserve network priority the present disclosure ensures that the frames get transmitted according to their priority specified by the initial network arbitration, for example CAN arbitration. To do so, the present disclosure maintains the priority bits intact in the ID field as shown in FIG. 1, which is an illustration of controller area network (CAN) formatted frames according to one non-limiting exemplary embodiment of the present disclosure. In that regard, the original CAN specification only allows for up to 8 bytes of data per frame and 11 bit ID and 29 bit in extended frame.

As seen in FIG. 1, an original ECU ID 10 and a randomized ECU ID 10' according to the present disclosure are shown. The priority bits (x bit) 12 of the original ID 10 remain unchanged relative to the priority bits (x bit) 12' of the randomized ID 10', while the source address bits (11-x bit) 14 of the original ID 10 are modified as described herein to a generated $ID_{NTX}$ (11-x bit) 14'.

Key Framework Management

Some proposed secure CAN protocols use symmetric keys and rolling code to generate session keys with the absence of any authentication process. While simple, such techniques increase the number of pre-shared keys. Other proposed techniques use an asymmetric key framework, which necessitates Public Key Infrastructure (PKI) and large key size, and therefore are not easy to implement in an automotive environment.

To overcome these limitations, in a CAN network, the present disclosure employs a simplified secure authentication CAN protocol in which each ECU maintains a dynamic table of secret keys and random CAN ID of all accepted CAN messages. The initial key K_s is seeded during the manufacturing stage and stored in the ECUs and the gateway ECU. The protocol works in two phases as described in detail below.

Session Initiation

Figure 2:
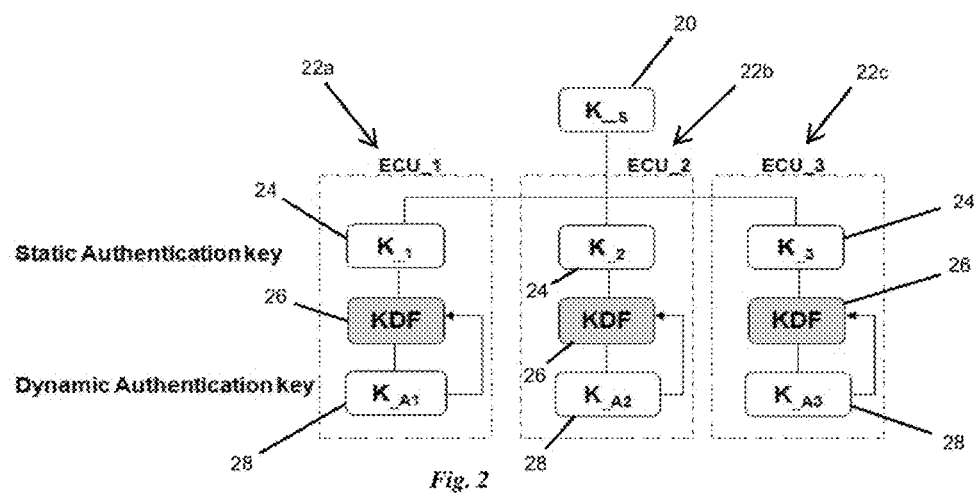
FIG. 2 is a block diagram of a key framework according to one non-limiting exemplary embodiment of the present disclosure.

With reference to FIG. 2, the session initiation may be performed when the vehicle is turned on for the first time. By using the pre-shared key K_s 20, each ECU 22a, 22b, 22c randomly selects a static authentication key $K_{\_i}$ 24 and shares it with the gateway ECU. The static authentication key $K_{\_i}$ 24 will be used by the gateway ECU as ECU_i authentication key (i indicates the number of ECU_i). Each ECU 22a, 22b, 22c periodically generates from $K_{\_i}$ 24 a new dynamic authentication key $K_{\_Ai}$ 28 associated with new randomized ID.

FIG. 2 is a block diagram of a key framework according to one non-limiting exemplary embodiment of the present disclosure, and presents a general overview of a proposed key framework for a secure CAN key framework. By using static authentication key $K_{\_i}$ 24 and a Key Derivation Function (KDF) 26, each ECU_i 22 generates its own dynamic authentication key $K_{\_Ai}$, 28, which is used to generate a random ID 14' and to authenticate ECU_i 22 by the gateway ECU and all ECUs 22 in the virtual group. The dynamic authentication key $K_{\_Ai}$, 28 will be used to generate a cipher key $K_{Ci}$, such as via a Diffie-Hellman (DH) key exchange, when secure communication is needed between two ECUs, or which can be used to generate an authentication MAC for data frame authentication. The present disclosure thus ensures entity authentication, secure exchanged data (integrity and confidentiality), and access control along with policy management.

Dynamic ID and Key Generation

Figure 3A:
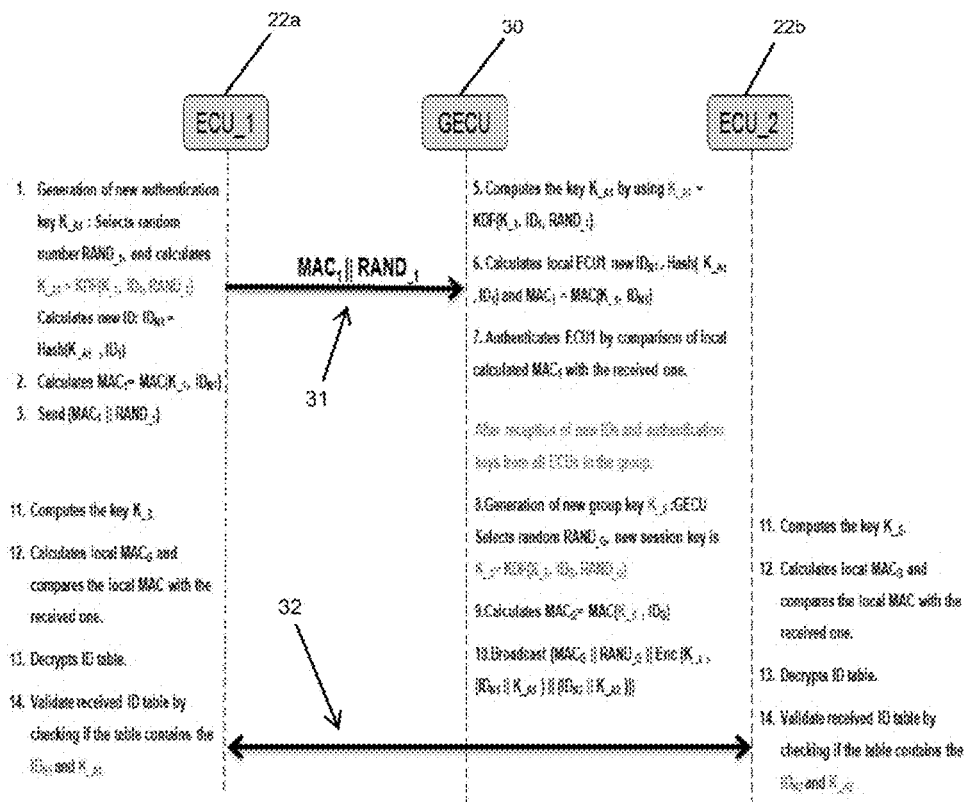
FIG. 3A is a flowchart illustrating dynamic authentication key generation according to one non-limiting exemplary embodiment of the present disclosure.

With reference to FIG. 3A, a flowchart depicts dynamic authentication key generation according to one non-limiting exemplary embodiment of the present disclosure. More particularly, FIG. 3A illustrates the process deployed by ECUs 22 to generate the dynamic authentication keys $K_{\_Ai}$ 28 and new identities $ID_N$ 14 by using the pre-shared key $K_{\_s}$ 20.

As seen therein, the receiver ECUs 22 are a group of n recipient nodes in a virtual group. ECU_1 22a, randomly selects a random number $RAND_{\_1}$ and creates the dynamic authentication key $K_{\_A1}$=KDF ($K_{\_1}$, $ID_1$, $RAND_{\_1}$), where KDF is a cryptographic one-way key derivation function. To protect the exchanged data from eavesdropping and reverse engineering, ECU_1 22a, uses a hash function to generate a new random identity $ID_{N1}$=Hash($K_{\_A1}$, $ID_1$), which will be used to authenticate ECU_1 22a next time. In addition, using a message authentication code function, ECU_1 22a calculates a message authentication code $MAC_1$=MAC($K_{\_1}$, $ID_1$), which will be used to authenticate the ECU_1 by the gateway ECU and to check the integrity of the frame. Then ECU_1 sends to the GECU 30 a CAN frame with the calculated $MAC_1$ and $RAND_{\_1}$ (i.e., ($MAC_1 \| RAND_{\_1}$) 31.

Upon receiving the request 32 from ECU_1 22a, GECU 30 checks the user identity. The GECU 30 computes the same dynamic authentication key by $K_{\_A1}$ ($K_{\_A1}$=KDF ($K_{\_1}$, $ID_1$, $RAND_{\_1}$)). Next, the GECU 40 calculates the next authentication $ID_{N1}$ 14' of ECU_1 22a ($ID_{N1}$=Hash ($K_{\_A1}$, $ID_1$)). The GECU 30 also calculates a local $MAC_1$ ($MAC_1$=MAC($K_{\_1}$, $ID_1$)), and compares the calculated $MAC_1$ with the received $MAC_1$ from ECU 22a. If the calculated and received MACs do not match, the authentication procedure is stopped.

Otherwise, after receipt of all new IDs 14' from ECUs 22 in the group, the GECU 30 broadcasts the new authentication table to all ECUs in the virtual group and protects the broadcasted message with a new key K_s generated by using KDF. More particularly, as seen in FIG. 3, the GECU 30 generates a random number $RAND_{\_G}$, and generates a new group key $K_s$ based on the previous group key and the ID of the GECU 30, namely, $K_{\_s}$=KDF($K_{\_s}$, $ID_G$, $RAND_{\_G}$). The GECU 30 then calculates a group message authentication code, $MAC_G$=MAC($K_{\_s}$, $ID_G$), and broadcasts ($MAC_G \| RAND_G \| Enc$ ($K_{\_s}$, ($ID_{N1} \| K_{\_A1}$)$\|(ID_{N2}\|K_{\_A2}$))) 32, where Enc represents an encryption function.

After receipt of the broadcast message, each ECU 22 in the virtual group calculates the new group key K_s based on the previous group key ($K_{\_s}$=KDF($K_{\_s}$, $ID_G$, $RAND_G$)). Each ECU 22 also calculates a local group message authentication code, $MAC_G$=MAC($K_{\_s}$, $ID_G$), and compares the locally computed $MAC_G$ to the received $MAC_G$ to verify a match. If the MACs match, each ECU 22 decrypts the gateway message, and validates the received ID table by checking if the table contains the identity and key of the local ECU, e.g., ECU_2 22b checks if the table contains $ID_{N2}$ and $K_{\_A2}$. If so, each ECU 22 updates the ID table with the new identities 10' and keys of all ECUi 22a, 22b. The gateway frame 34 from GECU 30 is considered by ECUi 22a, 22b as acknowledgement from the gateway ECU 30 to use the new identities 10' and keys.

Figure 3B:
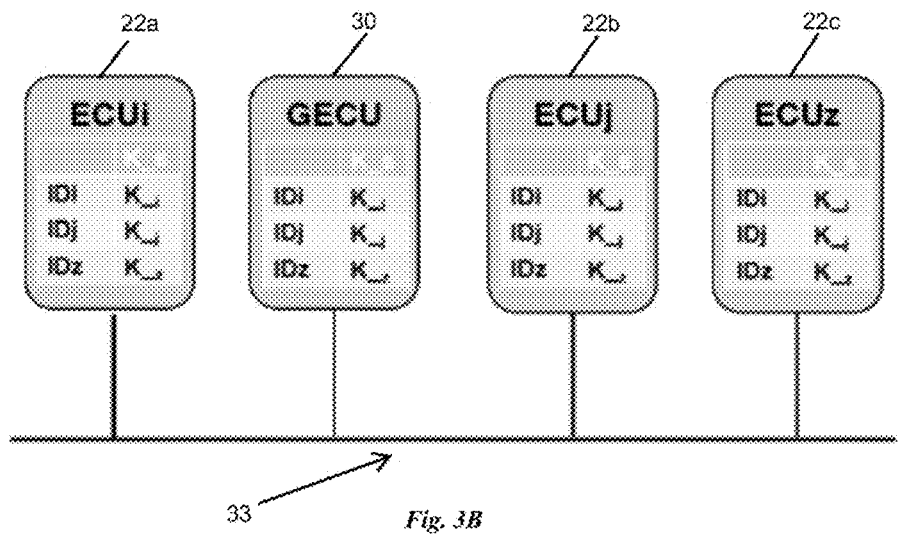
FIG. 3B is a block diagram of exemplary controllers according to one non-limiting exemplary embodiment of the present disclosure.

As previously noted, each ECU has a secure ID_key table which contains the ID of all frames in the network and their shared authentication key. The link between the original IDs 10 and the new IDs 10' of the ECUs 22 is assured by keeping the same table order of the new IDs 10'. FIG. 3B is a block diagram of exemplary controllers according to one non-limiting exemplary embodiment of the present disclosure, and illustrates ECUs 22a, 22b, 22c and GECU 30 in communication over a CAN bus 33. Each ECU 22a, 22b, 22c stores the same table with the ECU identities (e.g., IDi, IDj, IDz) and dynamic authentication keys (e.g., $K_{\_i}$, $K_{\_j}$, $K_{\_z}$), as well as the shared symmetric key K_s 20. As seen therein, each ECU 22a, 22b, 22c stores ID_key table in secure memory and keeps the link between the initial IDs (defined by OEM) and the new randomized ID by using the same table order of CAN messages.

Data Message Authentication

To check the validity of exchanged data and to prevent injection and replay attacks, the present disclosure reinforces the ID randomization by use of a cryptographic message authentication code MAC for all data frames. The present disclosure assigns a unique counter to each CAN-ID. The value of counter is reset to zero for each new session or new ID generation. When the frame data is generated, the ECU sender puts the counter value and the calculated MAC into the data field. The MAC value is protected by the session key K_s and is calculated as follows:

$$MAC\_i = MAC(K_{\_s}, payload \| counter)$$

Figure 3C:
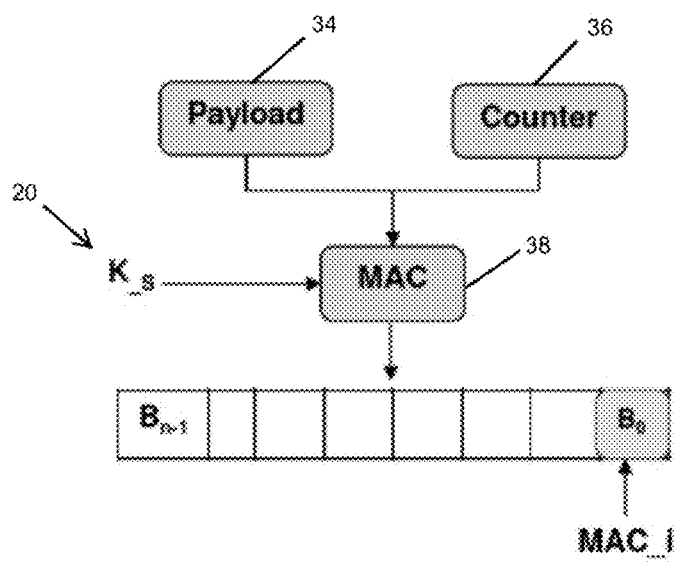
FIG. 3C is a block diagram illustrating the generation of a cryptographic message authentication code according to one non-limiting exemplary embodiment of the present disclosure.

FIG. 3C is a block diagram illustrating the generation of a cryptographic message authentication code according to one non-limiting exemplary embodiment of the present disclosure. More particularly, FIG. 3C depicts the generation of the message authentication code described above, including session key $K_{\_s}$ 20 as well as concatenated payload 34 and counter 36 input to message authentication code function, MAC 38, and resulting output MAC_i bits $B_0 \ldots B_{n-1}$. To protect the real-time capabilities of the system and bandwidth consumption, the present disclosure truncates the calculated MAC value down to 8 bit, which can be sent with the counter value. According to National Institute of Standards and Technology (NIST) and Federal Information Processing Standards (FIPS) recommendations, cryptographic authentication codes should have a minimal length of 64 bits when no additional measures to limit are taken. The present disclosure already has the obscured CAN-ID, which can be used to reinforce the protection of CAN frames. As a result, the present disclosure can limit the size of authentication codes to 1 byte.

Security Analysis

The performance enhancements of the present disclosure facilitate many services such as user anonymity, mutual authentication and secure session key establishment. The present disclosure guarantees a balance between security and performance, and satisfies all network security requirements. The security provided by the present disclosure is described below with reference to security requirements.

Mutual Entity Authentication

Entity authentication involves authentication of a claimant's identity through actual communications with an associated verifier during execution of an authentication protocol. Mutual authentication is achieved when each party is assured of the identity of the other party. The present disclosure provides a strong mutual authentication mechanism between an ECU and the gateway ECU, and between ECUs. Authentication is based on dynamic identity generation and on the secrecy of the authentication keys. ECUs authenticate each other by proving the possession of the correct ID and temporary authentication key $K_{\_i}$ and $K_{\_Ai}$. These keys are handled only by legitimate ECUs and the gateway ECU. In addition, the gateway ECU authenticates an ECU by verifying the calculated MACi with the received one.

Forward and Backward Secrecy

Another metric in security evaluation is the key distribution. All generated keys must be used in a specific context. The present disclosure provides a simple and secure key framework that guarantees backward and forward secrecy. Backward secrecy implies that the target ECU_j should not be able to access previous communications that have been exchanged between other ECUs and ECU_i. Forward secrecy implies that the serving ECU_j should not be able to access communications that will be exchanged between the ECU_i and the target ECU_x. ECUs share the temporary authentication key $K_{\_Ai}$ with the help of the gateway ECU by using KDF and without knowing secret key $K_{\_i}$ of each other. The temporary authentication key $K_{\_Ai}$ will be used by other ECUs as ECU_i's authentication key to derive the new session key $K_{Ci}$ for each secure communication between two ECUs.

Protection Against Attack

An attacker could intercept and save messages sent by a legal ECU and use such messages to perform a replay attack. The present disclosure protects against replay attacks because authentication frames are protected by random value RAND which is generated randomly for each new authentication and is used one time. In addition, data frames are protected by a MAC value and an obscured CAN-ID.

Figure 4:
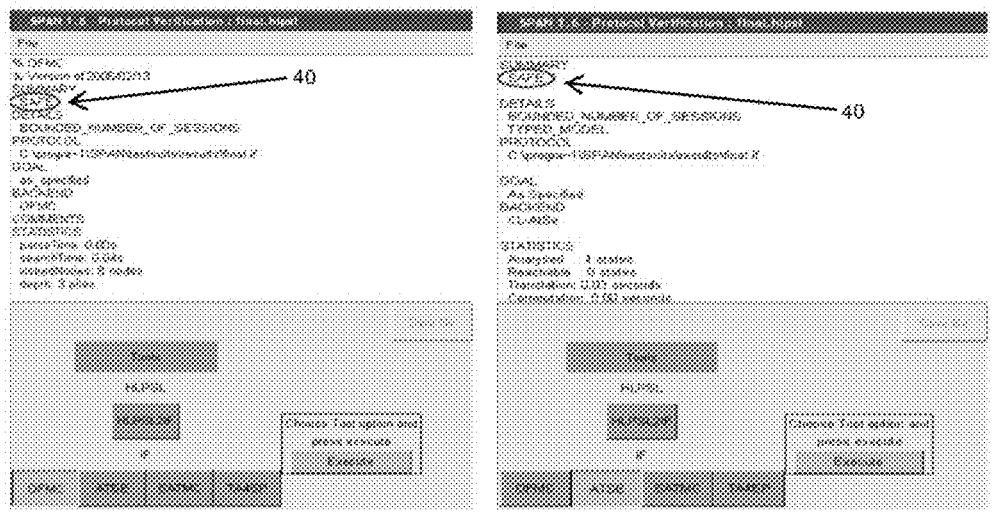
FIG. 4 illustrates security check results according to a verification tool for checking security properties for one non-limiting exemplary embodiment of the present disclosure.

Such security proprieties may be checked using a formal verification tool called Automated Validation of Internet Security Protocols and Applications (AVISPA). AVISPA is a model formal checking tool for internet security protocols that is widely used by developers of security protocols and by academic researchers to analyze possible attacks on security protocols. AVISPA is based on sending and receiving messages, and on performing decryption and digital signature verification actions. FIG. 4 illustrates security check results according to a verification tool for checking security properties for one non-limiting exemplary embodiment of the present disclosure. As seen therein, "safe" summary messages 40 are returned by AVISPA verification tools (OFMC and CL-AtSe) for the present disclosure.

Performance Evaluation

Figure 5:
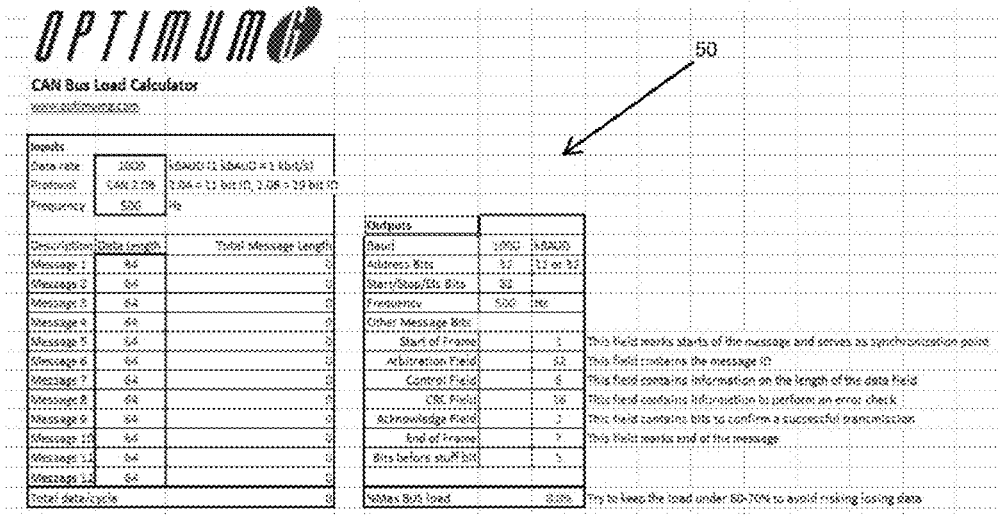
FIG. 5 illustrates a controller area network (CAN) bus load calculator for use with the present disclosure.

In order to calculate the load of a CAN bus, the tool "CAN bus load calculator" developed by OptimumG may be used. This tool is widely used when installing applications that implement the CAN bus to determine the maximum bandwidth consumption. FIG. 5 illustrates a controller area network (CAN) bus load calculator for use with the present disclosure. Vehicle network performance should not be adversely impacted by security improvements.

Figure 6:
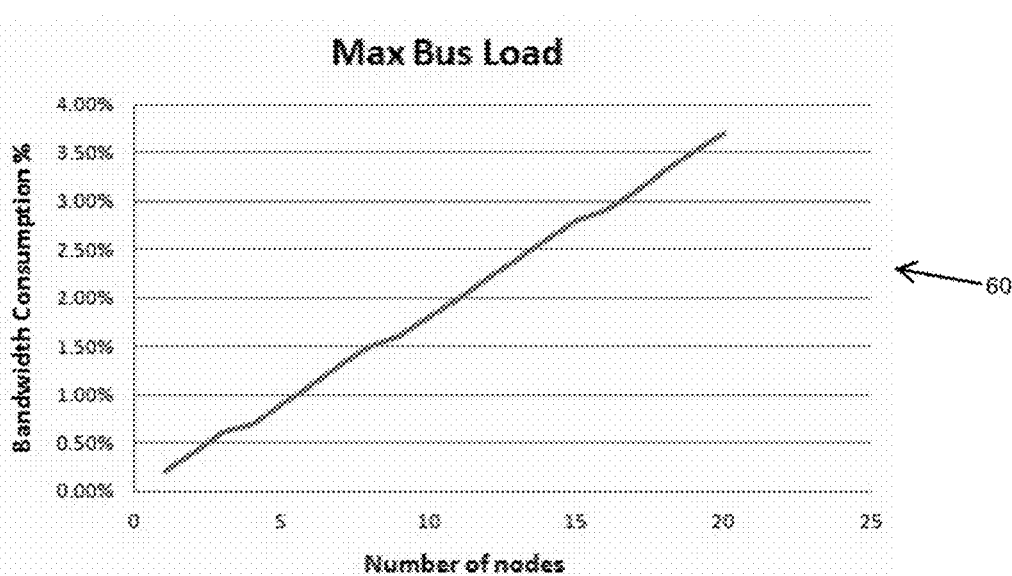
FIG. 6 is a graph illustrating controller area network (CAN) bus load consumption as a function of the number of controllers according to one non-limiting exemplary embodiment of the present disclosure.

FIG. 5 represents a screenshot 50 of the CAN Bus Load Calculator tool that provides a general overview of results returned by that tool. In one example, each ECU 22 generates periodically (100 ms) a new authentication key 28 and new identity 14' (phase 2), the size of exchanged MACi is 8 bit, and the generated key is 160 bits. For such an example, FIG. 6 is a graph illustrating controller area network (CAN) bus load consumption 60 as a function of the number of nodes 22. As seen therein, bus load consumption 60 is presented according to a changing number of nodes 22.

For this example, the CAN Bus Load tool shows in FIG. 6 that bandwidth consumption by CAN authentication for one ECU is 0.2% 60. In that same example, the CAN Bus Load tool also indicates that the consumed bandwidth by 20 nodes for CAN authentication is 3.70%. The cipher key between two ECUs 22 may be exchanged by using sporadic messages.

As is apparent, vehicle network performance is not negatively affected by the present disclosure. All ECUs 22a, 22b, 22c and the GECU 30 mutually authenticate each other by providing the possession of authentication keys. A simple key framework is provided, and no key is transmitted in the clear. Protection against attack is provided by using random numbers, RAND, and a message authentication code, MAC_i, calculated for each new transfer which are used only once. ECU identity is protected as all ECUs 22a, 22b, 22c use a temporary identity ID generated by a one-way function.

Figure 7:
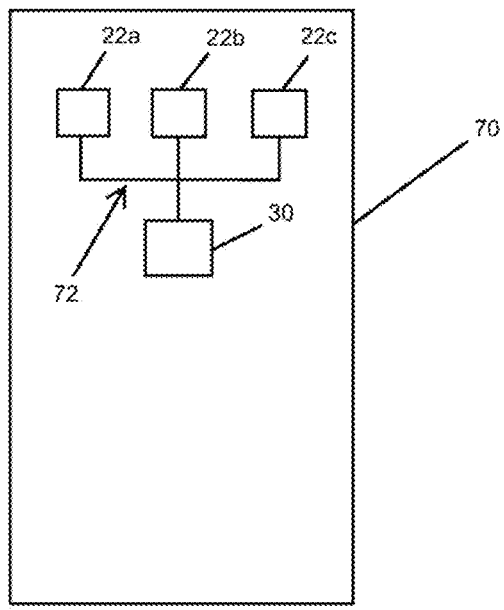
FIG. 7 is simplified system block diagram according to one non-limiting exemplary embodiment of the present disclosure.

Referring next to FIG. 7, a simplified system block diagram is shown according to one non-limiting exemplary embodiment of the present disclosure. As seen therein, the system may comprise a plurality of ECUs 22a, 22b, 22c and a gateway ECU 30. The ECUs 22a, 22b, 22c and GECU 30 may be provided in a vehicle 70 having a CAN bus 72, and may be configured for communication with each other over the CAN bus 72. It should be noted that the ECUs 22a, 22b, 22c and GECU 30, as well as any other system, device, unit, arrangement or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

The ECUs 22a, 22b, 22c and GECU 30 may provide a system for secure communications between controllers in a vehicle network. More particularly, such a system may comprise a plurality of controllers 22a, 22b, 22c associated in a group and configured to communicate with each other, each controller 22a, 22b, 22c in the group having an initial controller identification (ID) number and configured to communicate with a gateway controller.

As previously described, each controller 22a, 22b, 22c in the group may be configured to calculate an updated controller ID number and transmit the updated controller ID number to the gateway controller 30 in a secure fashion, and the gateway controller 30 may be configured to transmit the updated controller ID number of each controller 22a, 22b, 22c in the group to all of the controllers 22a, 22b, 22c in the group in a secure fashion. Each controller 22a, 22b, 22c in the group may be further configured to include its updated controller ID number in network messages transmitted to other controllers 22a, 22b, 22c in the group, and to authenticate other controllers 22a, 22b, 22c in the group based on the updated controller ID numbers in network messages received from the other controllers 22a, 22b, 22c. In the example shown in FIG. 7, the vehicle network comprises a controller area network (CAN) 72, although the system and method of the present disclosure may alternatively be used with or in any other types of vehicle networks.

As previously described, the controllers 22a, 22b, 22c in the group and the gateway controller 30 share an initial group key, and each controller 22a, 22b, 22c in the group has a unique static key shared with the gateway controller 30. Each controller 22a, 22b, 22c in the group may be configured to calculate an updated controller ID number, encrypt the updated controller ID number using its unique shared static key, and transmit a request message to the gateway controller 30 comprising the encrypted updated controller ID number.

The gateway controller 30, in response to receipt of a request message from one of the controllers 22a, 22b, 22c in the group, may be configured to authenticate that controller 22a, 22b, 22c in the group using its unique shared static key, and calculate the updated controller ID number of that controller 22a, 22b, 22c in the group. The gateway controller 30 may be further configured to calculate an updated shared group key based on the initial shared group key, encrypt the updated controller ID numbers of all of the controllers 22a, 22b, 22c in the group using the updated shared group key, and transmit a network broadcast message to all of the controllers 22a, 22b, 22c in the group comprising the encrypted updated controller ID numbers.

Each controller 22a, 22b, 22c in the group, in response to receipt of the broadcast message from the gateway controller 30, may be further configured to calculate the updated shared group key based on the initial shared group key, authenticate the gateway controller and decrypt the updated controller ID numbers of all of the controllers 22a, 22b, 22c in the group using the updated group key, and store the updated controller ID numbers of all of the controllers 22a, 22b, 22c in the group. Each controller 22a, 22b, 22c in the group may be further configure to include its updated controller ID number in network messages transmitted to other controllers 22a, 22b, 22c in the group, and to authenticate other controllers 22a, 22b, 22c in the group based on the updated controller ID numbers in network messages received from other controllers 22a, 22b, 22c.

The system and method according to the present disclosure described herein may be implemented in any type of non-transitory storage medium, such as non-volatile memory associated with ECUs 22a, 22b, 22c and/or GECU 30. Such a storage medium may comprise stored computer executable instructions for providing secure communications in a vehicle network including a plurality of controllers associated in a group and configured to communicate with each other, each of the controllers in the group having an initial controller identification (ID) number, and a gateway controller configured to communicate with each controller in the group. When executed, such instructions may cause each controller in the group to calculate an updated controller ID number and transmit the updated controller ID number to the gateway controller in a secure fashion, to include its updated controller ID number in network messages transmitted to other controllers in the group, and to authenticate other controllers in the group based on the updated controller ID numbers in network messages received from the other controllers. The instructions when executed may further cause the gateway controller to transmit the updated controller ID number of each controller in the group to all of the controllers in the group in a secure fashion. As previously described, the network may comprise a controller area network (CAN), although the storage medium of the present disclosure may alternatively be used with or in any other types of vehicle networks.

The controllers in the group and the gateway controller share an initial group key, and each controller in the group has a unique static key shared with the gateway controller, and the instructions when executed may further cause each controller in the group to calculate an updated controller ID number, encrypt the updated controller ID number using its unique shared static key, and transmit a request message to the gateway controller comprising the encrypted updated controller ID number. The instructions when executed may further cause the gateway controller, in response to receipt of a request message from one of the controllers in the group, to authenticate the one of the controllers in the group using its unique shared static key, calculate the updated controller ID number of the one of the controllers in the group. The instructions when executed may further cause the gateway controller to calculate an updated shared group key based on the initial shared group key, encrypt the updated controller ID numbers of all of the controllers in the group using the updated shared group key, and transmit a network broadcast message to all of the controllers in the group comprising the encrypted updated controller ID numbers.

When executed, the instructions may further cause each controller in the group, in response to receipt of the broadcast message from the gateway controller, to calculate the updated shared group key based on the initial shared group key, authenticate the gateway controller and decrypt the updated controller ID numbers of all of the controllers in the group using the updated group key, and store the updated controller ID numbers of all of the controllers in the group. The instructions when executed further cause each controller in the group to include its updated controller ID number in network messages transmitted to other controllers in the group, and authenticate other controllers in the group based on the updated controller ID numbers in network messages received from the other controllers.

As is readily apparent from the foregoing, non-limiting embodiments of a system and method for secure communications between controllers in a vehicle network have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for secure communications between controllers in a vehicle network, the system comprising:
    a plurality of controllers associated in a group and configured to communicate with each other, each controller in the group having an initial controller identification (ID) number and configured to communicate with a gateway controller;
    wherein each controller in the group is configured to calculate an updated controller ID number and to transmit in a secure fashion the updated controller ID number to the gateway controller, and the gateway controller is configured to authenticate the updated controller ID number of each controller in the group and to transmit in a secure fashion the updated controller ID number of each controller in the group to all of the controllers in the group; and
    wherein each controller in the group is further configured to include its updated controller ID number in network messages transmitted to other controllers in the group, and to authenticate other controllers in the group based on the updated controller ID numbers in network messages received from the other controllers.

2. The system of claim 1 wherein the vehicle network comprises a controller area network (CAN).

3. The system of claim 1 wherein the controllers in the group and the gateway controller share an initial group key, and each controller in the group has a unique static key shared with the gateway controller, and wherein each controller in the group is configured to calculate an updated controller ID number, encrypt the updated controller ID number using its unique shared static key, and transmit a request message to the gateway controller comprising the encrypted updated controller ID number.

4. The system of claim 3 wherein the gateway controller, in response to receipt of a request message from one of the controllers in the group, is configured to authenticate the one of the controllers in the group using its unique shared static key, and calculate the updated controller ID number of the one of the controllers in the group.

5. The system of claim 4 wherein the gateway controller is further configured to calculate an updated shared group key based on the initial shared group key, encrypt the updated controller ID numbers of all of the controllers in the group using the updated shared group key, and transmit a network broadcast message to all of the controllers in the group comprising the encrypted updated controller ID numbers.

6. The system of claim 5 wherein each controller in the group, in response to receipt of the broadcast message from the gateway controller, is further configured to calculate the updated shared group key based on the initial shared group key, authenticate the gateway controller and decrypt the updated controller ID numbers of all of the controllers in the group using the updated group key, and store the updated controller ID numbers of all of the controllers in the group, and wherein each controller in the group is further configure to include its updated controller ID number in network messages transmitted to other controllers in the group, and to authenticate other controllers in the group based on the updated controller ID numbers in network messages received from the other controllers.

7. The system of claim 6 further comprising the gateway controller.

8. A method for secure communications in a vehicle network comprising a plurality of controllers associated in a group and configured to communicate with each other, each of the controllers in the group having an initial controller identification (ID) number, and a gateway controller configured to communicate with each controller in the group, the method comprising:
    each controller in the group calculating an updated controller ID number and transmitting in a secure fashion the updated controller ID number to the gateway controller;
    the gateway controller authenticating the updated controller ID number of each controller in the group and transmitting in a secure fashion the updated controller ID number of each controller in the group to all of the controllers in the group; and
    each controller in the group including its updated controller ID number in network messages transmitted to other controllers in the group, and authenticating other controllers in the group based on the updated controller ID numbers in network messages received from the other controllers.

9. The method of claim 8 wherein the vehicle network comprises a controller area network (CAN).

10. The method of claim 8 wherein the controllers in the group and the gateway controller share an initial group key, and each controller in the group has a unique static key shared with the gateway controller, and further comprising each controller in the group calculating an updated controller ID number, encrypting the updated controller ID number using its unique shared static key, and transmitting a request message to the gateway controller comprising the encrypted updated controller ID number.

11. The method of claim 10 further comprising the gateway controller, in response to receipt of a request message from one of the controllers in the group, authenticating the one of the controllers in the group using its unique shared static key, and calculating the updated controller ID number of the one of the controllers in the group.

12. The method of claim 11 further comprising the gateway controller calculating an updated shared group key based on the initial shared group key, encrypting the updated controller ID numbers of all of the controllers in the group using the updated shared group key, and transmitting a network broadcast message to all of the controllers in the group comprising the encrypted updated controller ID numbers.

13. The method of claim 12 further comprising each controller in the group, in response to receipt of the broadcast message from the gateway controller, calculating the updated shared group key based on the initial shared group key, authenticating the gateway controller and decrypting the updated controller ID numbers of all of the controllers in the group using the updated group key, and storing the updated controller ID numbers of all of the controllers in the group, and further comprising each controller in the group including its updated controller ID number in network messages transmitted to other controllers in the group, and authenticating other controllers in the group based on the updated controller ID numbers in network messages received from the other controllers.

14. A non-transitory storage medium having stored computer executable instructions for providing secure communications in a vehicle network including a plurality of controllers associated in a group and configured to communicate with each other, each of the controllers in the group having an initial controller identification (ID) number, and a gateway controller configured to communicate with each controller in the group, wherein the instructions when executed cause:
each controller in the group to calculate an updated controller ID number and to transmit in a secure fashion the updated controller ID number to the gateway controller; and
each controller in the group to include its updated controller ID number in network messages transmitted to other controllers in the group, and to authenticate other controllers in the group based on the updated controller ID numbers in network messages received from the other controllers; and
the gateway controller to authenticate the updated controller ID number of each controller in the group and to transmit in a secure fashion the updated controller ID number of each controller in the group to all of the controllers in the group.

15. The storage medium of claim 14 wherein the vehicle network comprises a controller area network (CAN).

16. The storage medium of claim 14 wherein the controllers in the group and the gateway controller share an initial group key, and each controller in the group has a unique static key shared with the gateway controller, and the instructions when executed further cause each controller in the group to calculate an updated controller ID number, encrypt the updated controller ID number using its unique shared static key, and transmit a request message to the gateway controller comprising the encrypted updated controller ID number.

17. The storage medium of claim 16 wherein the instructions when executed further cause the gateway controller, in response to receipt of a request message from one of the controllers in the group, to authenticate the one of the controllers in the group using its unique shared static key, and calculate the updated controller ID number of the one of the controllers in the group.

18. The storage medium of claim 17 wherein the instructions when executed further cause the gateway controller to calculate an updated shared group key based on the initial shared group key, encrypt the updated controller ID numbers of all of the controllers in the group using the updated shared group key, and transmit a network broadcast message to all of the controllers in the group comprising the encrypted updated controller ID numbers.

19. The storage medium of claim 18 wherein the instructions when executed further cause each controller in the group, in response to receipt of the broadcast message from the gateway controller, to calculate the updated shared group key based on the initial shared group key, authenticate the gateway controller and decrypt the updated controller ID numbers of all of the controllers in the group using the updated group key, and store the updated controller ID numbers of all of the controllers in the group, and wherein the instructions when executed further cause each controller in the group to include its updated controller ID number in network messages transmitted to other controllers in the group, and authenticate other controllers in the group based on the updated controller ID numbers in network messages received from the other controllers.

* * * * *